United States Patent
Wahler et al.

(10) Patent No.: US 7,305,570 B2
(45) Date of Patent: Dec. 4, 2007

(54) FAILSAFE SLAVE MECHANISM FOR MISSION CRITICAL APPLICATIONS

(75) Inventors: Richard E. Wahler, St. James, NY (US); Kevin Harney, Brooklyn, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 338 days.

(21) Appl. No.: 10/919,083

(22) Filed: Aug. 16, 2004

(65) Prior Publication Data

US 2006/0036879 A1 Feb. 16, 2006

(51) Int. Cl.
*G06F 1/00* (2006.01)
*G06F 11/00* (2006.01)

(52) U.S. Cl. .................... 713/300; 714/13
(58) Field of Classification Search ............ 713/300; 714/13
See application file for complete search history.

(56) References Cited

U.S. PATENT DOCUMENTS

| | | | |
|---|---|---|---|
| 4,586,179 A | | 4/1986 | Sirazi et al. |
| 4,627,060 A | * | 12/1986 | Huang et al. ............ 714/36 |
| 4,879,647 A | | 11/1989 | Yazawa |
| 4,912,708 A | | 3/1990 | Wendt |
| 4,982,404 A | | 1/1991 | Hartman |
| 5,341,497 A | | 8/1994 | Younger |
| 5,513,319 A | | 4/1996 | Finch et al. |
| 5,530,946 A | * | 6/1996 | Bouvier et al. ........... 714/23 |
| 5,746,203 A | | 5/1998 | Hood, Jr. |
| 5,864,663 A | | 1/1999 | Stolan |
| 5,906,315 A | * | 5/1999 | Lewis et al. ............ 236/49.3 |
| 5,947,907 A | | 9/1999 | Duich |
| 6,006,150 A | * | 12/1999 | Ueda ..................... 701/53 |
| 6,006,168 A | * | 12/1999 | Schumann et al. ........ 702/132 |
| 6,101,617 A | * | 8/2000 | Burckhartt et al. ........ 714/23 |
| 6,112,320 A | | 8/2000 | Dien |
| 6,134,667 A | * | 10/2000 | Suzuki et al. ............ 713/300 |
| 6,188,189 B1 | | 2/2001 | Blake |
| 6,243,656 B1 | * | 6/2001 | Arai et al. ............. 702/132 |

(Continued)

OTHER PUBLICATIONS

Integrated Technology Express, Inc., "IT8201R Jumper Free Over Clock Controller", Preliminary Specification 0.1, 2003.

*Primary Examiner*—Thomas Lee
*Assistant Examiner*—Ji H Bae
(74) *Attorney, Agent, or Firm*—Meyertons Hood Kivlin Kowert & Goetzel, P.C.; Jeffrey C. Hood; Mario J. Lewin

(57) ABSTRACT

In one embodiment, a monitoring device (e.g., a slave device) may be configured to perform a plurality of monitoring functions. For example, the monitoring device may comprise a watchdog timer configured to monitor communications between the processing unit (e.g., a host processor) and the monitoring device. The watchdog timer may cause the monitoring device to enter a failsafe mode of operation if the processing unit fails to communicate with the monitoring device within a predetermined period of time. Additionally, the monitoring device may be configured to perform thermal management functions via one or more temperature sensors. The monitoring device may enter the failsafe mode of operation if a sensed temperature exceeds a predetermined temperature limit. Furthermore, the monitoring device may also comprise a status unit that is operable to provide the processing unit an indication of a state of the monitoring device.

39 Claims, 3 Drawing Sheets

U.S. PATENT DOCUMENTS

| | | | |
|---|---|---|---|
| 6,390,379 B1 * | 5/2002 | Huang | 236/49.3 |
| 6,523,126 B1 | 2/2003 | Brabenac | |
| 6,587,966 B1 * | 7/2003 | Chaiken et al. | 714/34 |
| 6,601,168 B1 * | 7/2003 | Stancil et al. | 713/100 |
| 2003/0126473 A1 * | 7/2003 | Maciorowski et al. | 713/300 |

* cited by examiner

FAILSAFE SLAVE MECHANISM FOR MISSION CRITICAL APPLICATIONS

BACKGROUND OF THE INVENTION

1. Field of the Invention

This invention relates generally to failsafe mechanisms and, more particularly, to a system and method for implementing a failsafe mode of operation with respect to a slave device.

2. Description of the Related Art

In applications where a critical function is being performed in a system (e.g. battery charging or fan control in portable computers), slave devices may perform monitoring functions. For example, a slave device may monitor the temperature associated with a particular subsystem to determine whether to turn on the system fans. Typically, monitoring slave devices depend on the host processor for sending setup and critical information associated with the particular functions being performed during system operation. If the host processor malfunctions or has overextended its resources, the critical information (e.g., a temperature limit) may not be sent to the monitoring device in a timely manner. Damage to the system could result if the monitoring device fails to receive such information, for example, a subsystem may overheat or a battery may be overcharged.

In some implementations, the monitoring device (e.g., the slave device), in addition to performing the monitoring functions associated with the critical operations being performed in the system, may send a check signal to the processor to determine if the processor is working properly. If the processor responds with the correct data, then this indicates to the monitoring device that the processor is operating properly. However, if the processor fails to respond or sends incorrect data, then the monitoring device resets the processor because this indicates that the processor is malfunctioning.

In other implementations, a system may include a watchdog timer to monitor the activity of a host processor. The watchdog timer is typically a counter that counts down from a particular time value. If the processor fails to reset the watchdog timer before it counts down to zero, the watchdog timer resets the processor since this is indicative that the processor is malfunctioning.

SUMMARY OF THE INVENTION

Various embodiments of a system and method are disclosed for determining whether a monitoring device (e.g., a slave device) should enter a failsafe mode of operation. In one embodiment, the monitoring device may be configured to perform a plurality of monitoring functions. For example, the monitoring device may comprise a watchdog timer configured to monitor communications between the processing unit (e.g., a host processor) and the monitoring device. The watchdog timer may cause the monitoring device to enter a failsafe mode of operation if the processing unit fails to communicate with the monitoring device within a predetermined period of time.

In one embodiment, the watchdog timer may be configured to monitor communications from the processing unit to a status unit of the monitoring device. Each time the processing unit accesses the status unit, the watchdog timer is reset to begin counting down a predetermined period of time. However, if the processing unit fails to access the status unit of the monitoring device within the predetermined amount of time, the watchdog timer may cause the monitoring device to enter the failsafe mode of operation.

For example, the monitoring device may enter a failsafe mode of operation if the processing unit is malfunctioning and fails to access the status unit. In the failsafe mode of operation, the monitoring device may perform one or more failsafe operations independent of the processing unit to protect the system from damage. For example, during the failsafe mode of operation, the monitoring device may control a fan subsystem by turning the fans on full to prevent the system from overheating.

In one embodiment, the monitoring device may be further configured to perform thermal management functions via one or more temperature sensors to prevent, for example, an analog subsystem that is highly sensitive to temperature variations from overheating. The processing unit may program one or more temperature limit registers comprised in a temperature monitoring unit of the monitoring device with a temperature limit corresponding to a particular subsystem. The monitoring device may enter the failsafe mode of operation if a sensed temperature exceeds the predetermined temperature limit.

In one embodiment, the monitoring device may also comprise a status unit that may provide the processing unit an indication of a state of the monitoring device. In this embodiment, the status unit may comprise a bit that toggles each time the status unit is accessed to provide the processing unit an indication that the monitoring device is working properly. However, if the bit fails to toggle when the processing unit accesses the status unit, the processing unit may reset the monitoring device.

Figure 1:
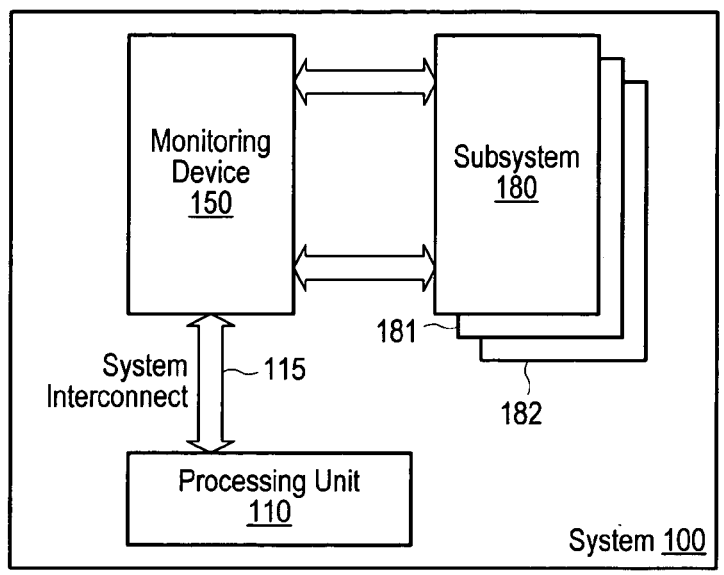
FIG. 1 is a block diagram illustrating one embodiment of a system comprising a monitoring device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Turning now to FIG. 1, a block diagram illustrating one embodiment of a system 100 is shown. The system 100 may comprise a processing unit 110 coupled to a monitoring device 150 via a system interconnect 115. Additionally, the system 100 may comprise one or more subsystems 180-182 coupled to the monitoring device 150. It is noted that processing unit 110, monitoring device 150, and subsystems 180-182 may each be comprised in any type of integrated circuit (IC), for example, a mixed-signal IC. It is also noted that the system 100 may be any of various types of computing or processing systems, including a personal computer system (PC), mainframe computer system, workstation, network appliance, Internet appliance, personal digital assistant (PDA), television system, audio systems, grid computing system, or other device or combinations of devices. In general, the term "computer system" can be broadly defined to encompass any device (or combination of devices) having at least one processor that executes instructions from a memory medium.

The processing unit 110 may be representative of a processor in the x86 family of processors. However, it is contemplated that in other embodiments, the processing unit 110 may be representative of other types of processors such as a processor in the SPARC™ family of processors, for example. In it also noted that the processing unit 110 may be any device capable of processing data, such as a microcontroller.

System interconnect 115 is illustrative of any interconnect structure for coupling the processor 110 to the monitoring device 150. In one embodiment, system interconnect 120 may be formed by a shared bus, such as a System Management Bus (SMBus) or a Serial Peripheral Interface (SPI). In other embodiments, system interconnect 120 may be formed by a point-to-point switched network or may be any type of transmission mechanism.

Each of the subsystems 180-182 may be any type of subsystem that is typically found in computer systems. For example, the subsystem 180 may be a memory subsystem, a battery subsystem, a fan subsystem, an audio subsystem, or a video subsystem, among others. The subsystem 180 may be an analog subsystem that is highly sensitive to temperature variations and may require temperature monitoring to operate properly.

The monitoring device 150 may be a slave device that is configured to perform a plurality of monitoring functions. The monitoring device 150 may comprise a time-based mechanism (e.g., a watchdog timer) that will trigger failsafe procedures if the processing unit 110 (e.g., a host processor) fails to communicate with the monitoring device 150 within a programmable period of time. For example, the monitoring device 150 may enter a failsafe mode of operation if the processing unit 110 is malfunctioning. In the failsafe mode of operation, the monitoring device 150 may perform failsafe operations independent of the processing unit 110 to protect the system 100 from damage. For example, during the failsafe mode of operation, the monitoring device 150 may control a fan subsystem to turn on one or more of the fans to a maximum speed to prevent the system 100 from overheating. As used herein, the term "watchdog timer" refers to a timer that counts a certain period of time, e.g., which counts down from a specified or predetermined value.

More specifically, in one embodiment, monitoring device 150 may comprise a watchdog timer configured to monitor communications between the processing unit 110 and the monitoring device 150. The watchdog timer may cause the monitoring device 150 to enter a failsafe mode of operation if the processing unit 110 fails to communicate with the monitoring device 150 within a predetermined period of time.

Furthermore, the monitoring device 150 may comprise a status unit that is operable to provide the processing unit 110 an indication of a state of the monitoring device 150. For example, the status unit may indicate whether the monitoring device 150 is working properly.

In one embodiment, the monitoring device 150 may be implemented in hardware. In a further embodiment, the monitoring device 150 may be implemented in software. In yet another embodiment, the monitoring device 150 may be implemented in both hardware and software. In one embodiment, the functionality described above with regard to the monitoring device 150 may be distributed across multiple components. In various embodiments, this type of functional distribution may also apply to other components described herein.

It is noted that the embodiment illustrated in FIG. 1 is meant to be exemplary only, and is not intended to limit the methods disclosed herein to any particular application domain. Rather, the techniques described herein are contemplated for use in a wide variety of applications.

Figure 2:
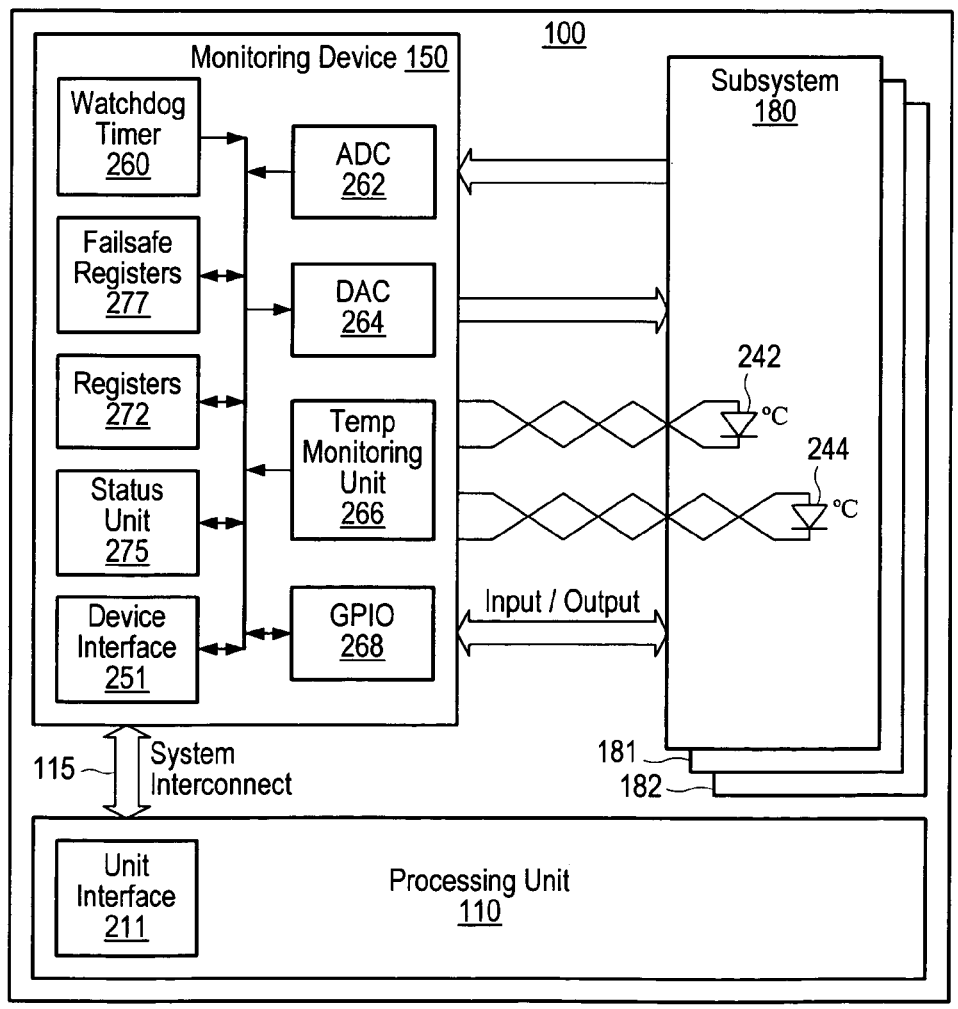
FIG. 2 is a block diagram illustrating one embodiment of the system including a block diagram of one embodiment of the monitoring device.

FIG. 2 illustrates a block diagram of one embodiment of the system 100 including a block diagram of one embodiment of the monitoring device 150. Components that correspond to those shown in FIG. 1 are numbered identically for simplicity and clarity. In one embodiment, the monitoring device 150 comprises a watchdog timer 260, at least one analog to digital converter (ADC) 262, at least one digital to analog converter (DAC) 264, at least one temperature monitoring unit 266, general-purpose input/output (GPIO) circuitry 268, a status unit 275, failsafe registers 277, registers 272, and a device interface 251. The processing unit 110 comprises a unit interface 211, which is coupled to the device interface 251 of the monitoring device 150 via the system interconnect 115. The subsystem 180 may comprise the temperature sensors 242 and 244, which may be coupled to the temperature monitoring unit 266 of the monitoring device 150.

It should be noted that the components described, for example with reference to FIG. 2, are meant to be exemplary only, and are not intended to limit the invention to any specific set of components or configurations. For example, in various embodiments, one or more of the components described may be omitted, combined, modified, or additional components included, as desired.

The ADC 262 may be configured to convert an analog signal input (e.g., a sine wave) received, for example, from subsystem 180, which is typically a voltage that varies in amplitude over time and therefore theoretically has an infinite number of states, to a digital signal. The DAC 264 may be configured to convert a digital signal (e.g., a binary bit patter) provided by monitoring device 150, which typically consists of a signal having two defined states (i.e., binary), to an analog signal that may be sent to, for example, subsystem 180. Both the ADC 262 and the DAC 264 of the monitoring device 150 may help to perform the one or monitoring functions by converting signals to the appropriate form. The GPIO circuitry 268 may be configured to provide a plurality of general-purpose lines to interface with one or more of the subsystems 180-182 to perform one or more monitoring functions. The temperature monitoring unit 266 may be configured to monitor a temperature associated with the system 100 and/or the subsystem 180 for thermal management functions. For example, the temperature monitoring unit 266 may monitor the temperature associated with the subsystem 180 via the temperature sensors 242 and 244.

The status unit 275 of the monitoring device 150 may provide an indication to the processing unit 110 of the state of the system. For example, the status unit may provide an indication to the processing unit 110 that the monitoring device 150 is malfunctioning or working properly. In addition, the status unit may provide the processing unit 110 an indication of whether the monitoring device 150 is in a failsafe mode of operation. In one embodiment, the status unit may comprise a status register. The failsafe registers 277 may comprise one or more programmable failsafe DAC registers and one or more programmable failsafe GPIO registers. The failsafe registers 277 may control the state of the DAC 264 and the GPIO circuitry 268 when the monitoring device enters the failsafe mode of operation. The registers 272 may comprise a plurality of registers, such one or more configuration registers, one or more ADC registers, one or more DAC registers, and one or more GPIO registers, one or more watchdog timer registers, one or more temperature registers, and one or more temperature limit registers, among others.

The monitoring device 150 may be configured to perform a plurality of monitoring functions with respect to one or more of the subsystems 180-182. In one embodiment, the monitoring device 150 may be a bus controlled, general-purpose device (e.g., a slave device) that, together with the processing unit 110 (e.g., a host processor), may perform analog monitoring of one or more of the subsystems 180-182. For example, the monitoring device 150 may perform thermal management functions with respect to subsystem 180 and/or battery management functions with respect to a battery subsystem, among others. Also, the monitoring device 150 may be configured to monitor the activity of the processing unit 110 to determine, for example, if the processing unit is working properly.

Figure 3:
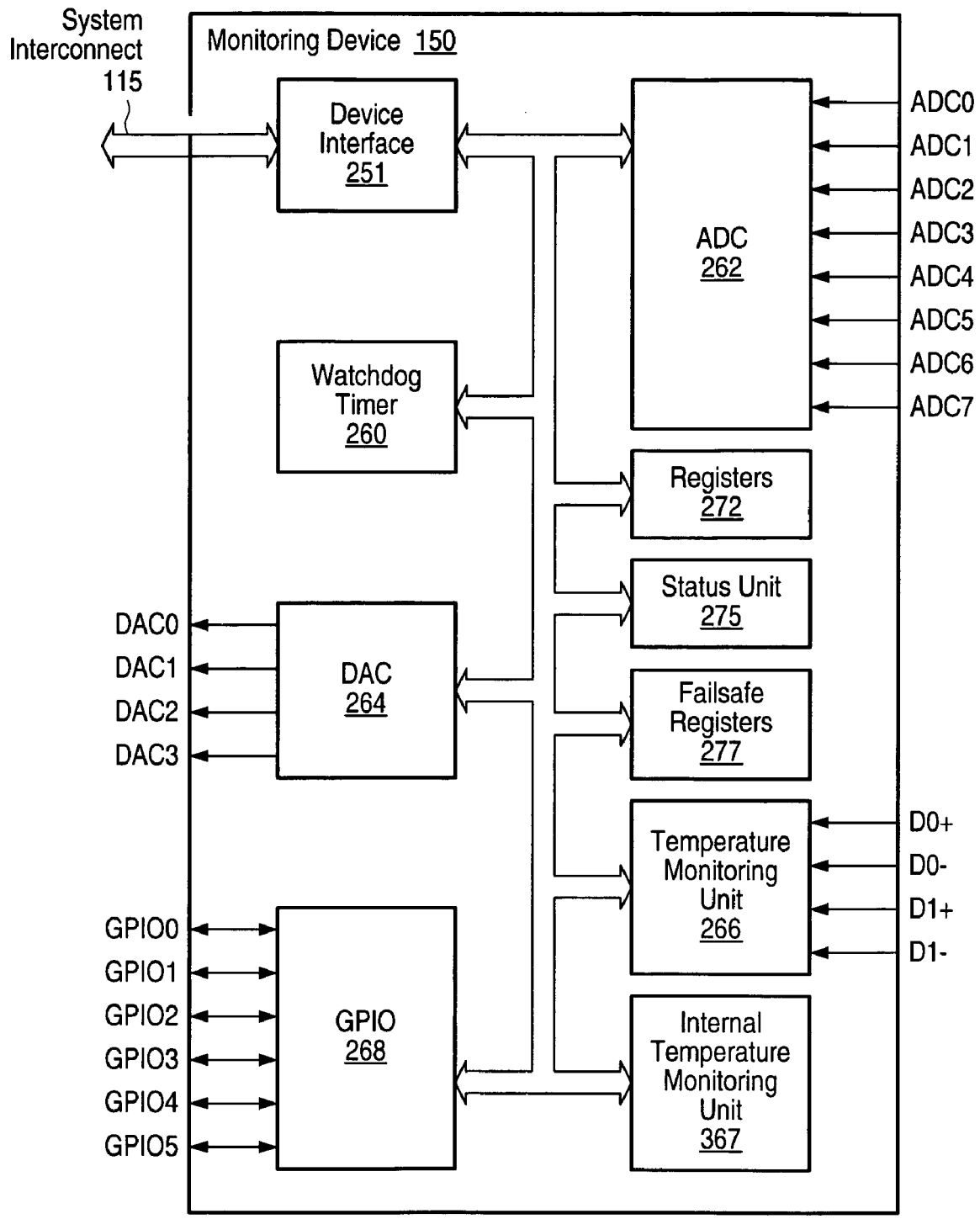
FIG. 3 is a block diagram illustrating one embodiment of the monitoring device.

Referring to FIG. 3, a block diagram illustrating one embodiment of the monitoring device 150 is shown. Components that correspond to those shown in FIG. 2 are numbered identically for simplicity and clarity. Referring collectively to FIG. 2 and FIG. 3, in one embodiment, the monitoring device 150 may be a bus controlled, general-purpose device that may comprise an 8-channel ADC 262 including channels ADC0-ADC7, a 4-channel DAC 264 including channels DAC0-DAC3, a temperature monitoring unit 266 that is operable to monitor the temperature sensed by two temperature sensors via channels D0+, D0−, D1+, and D1−, an internal temperature monitoring unit 367 that is operable to monitor the temperature associated with the monitoring device 150 sensed by an internal temperature sensor, and GPIO circuitry 268 including 6 channels (e.g., GPIO0-GPIO5).

The thermal management functions that may be performed by the monitoring device 150 may prevent, for example, an analog subsystem that is highly sensitive to temperature variations from overheating. The processing unit 110 may program one or more temperature limit registers comprised in the temperature monitoring unit 266 with a temperature limit corresponding to, for example, subsystem 180. The temperature monitoring unit 266 of monitoring device 150 may also comprise one or more temperature register that are operable to store the temperature sensed by the one or more temperature sensors with respect to subsystem 180. If the sensed temperature associated with subsystem 180 rises above the programmed temperature limit, the breach of the temperature limit associated with subsystem 180 may be indicated in status unit 275. Also, in response to the breach of the temperature limit, the monitoring device 150 may enter the failsafe mode of operation. It is noted that the failsafe mode of operation of the monitoring device 150 will be described below. In one embodiment, the monitoring device 150 may enter the failsafe mode of operation if this feature with respect to temperature limits is enabled in, for example, a temperature configuration register.

In one embodiment, if the sensed temperature associated with subsystem 180 rises above the programmed temperature limit, the processing unit 110 may detect the breach of the temperature limit associated with subsystem 180 by accessing the status unit 275 of monitoring device 150. In response to detecting the temperature limit breach, the processing unit 110 may turn on or increase the speed of a fan subsystem via, for example, channel DAC0 of the DAC 264 or channel GPIO2 of the GPIO circuitry 268 to cool the subsystem 180 so the sensed temperature drops below the temperature limit. For example, one or more fans of the fan subsystem may be forced to run at a maximum speed until the monitoring device 150 detects that the temperature associated with subsystem 180 is below the temperature limit specified in the corresponding temperature limit register.

The battery management functions that may be performed by the monitoring device 150 may prevent, for example, the overcharging of a battery of a computer system (e.g., a portable computer). The monitoring device 150 may comprise one or more DAC registers and one or more GPIO registers. Based on the status of the battery charging detected by the monitoring device 150, the processing unit 110 may program a DAC or a GPIO register accordingly to continue or to stop the charging of the battery subsystem. In another embodiment, if a plurality of batteries are being charged, the processing unit 110 may program the DAC or the GPIO registers to perform functions such as switching from one battery to another. For example, by programming the one of the GPIO registers, a control signal may be sent via channel GPIO4 of the GPIO circuitry 268 to control an external multiplexer, which selects one of the plurality of batteries to be charged at a particular time.

The monitoring device 150 may be configured to monitor the activity of the processing unit 110 to determine, for example, if the processing unit is working properly. In one embodiment, the monitoring device 150 may comprise the watchdog timer 260 that is configured to monitor communications between the processing unit 110 and the monitoring device 150. The watchdog timer 260 may be reset to begin counting down the predetermined period of time each time the processing unit 110 communicates with the monitoring device 150. However, the watchdog timer 260 may cause the monitoring device 150 to enter the failsafe mode of operation if the processing unit 110 fails to communicate with the monitoring device 150 within a predetermined period of time. In one embodiment, the monitoring device 150 may enter the failsafe mode of operation if a watchdog functionality is enabled in, for example, a configuration register of monitoring device 150.

Additionally, the monitoring device 150 may comprise a status unit 275 that is operable to provide the processing unit 110 an indication of a state of the monitoring device 150. In one embodiment, the status unit 275 may comprise a status register. It is noted however that in other embodiments the status unit may include any type of storage mechanism. In one embodiment, the status unit 275 may comprise a bit (e.g., TOGL bit) that toggles each time the processing unit 110 accesses the status unit 275 to provide the processing unit 110 an indication that the monitoring device 150 is working properly. Also, the toggling of the bit of the status unit 275 may indicate that the transmissions over the system interconnect 115 are being received by the monitoring device 150. However, if the bit fails to toggle when the processing unit 110 accesses the status unit 275 and instead remains in a current state, the processing unit 110 may reset the monitoring device 150. After the processing unit 110 resets the monitoring device 150, if the bit fails to toggle, then the processing unit 110 may independently perform certain functions to prevent any critical failures, for example, increase the speed of one or more fans of a fan subsystem or stop the charging of one or more batteries, as described above.

Figure 4:
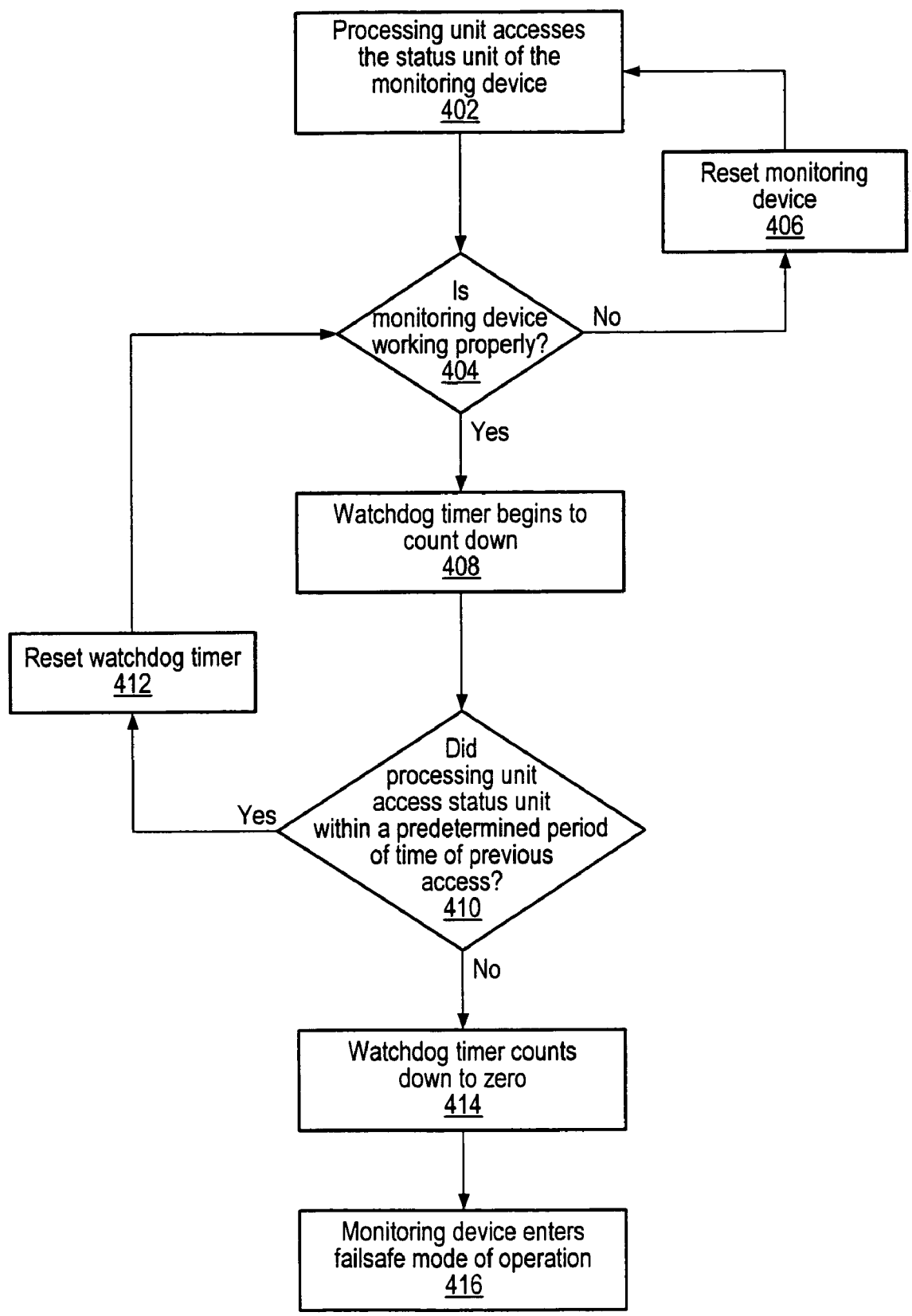
FIG. 4 is a flow diagram illustrating a method for determining whether the monitoring device should enter a failsafe mode of operation, according to one embodiment.

FIG. 4 is a flow diagram illustrating a method for determining whether the monitoring device 150 should enter a failsafe mode of operation. It should be noted that in various embodiments, some of the steps shown may be performed concurrently, in a different order than shown, or omitted. Additional steps may also be performed as desired.

Referring collectively to FIG. 1-4, in one embodiment, the processing unit 110 may be configured to repeatedly access the status unit 275 of the monitoring device 150 to determine the state of the system 100, as indicated by block 402. When accessing the status unit 275, the processing unit 110 may determine whether the monitoring device 150 is working properly, as indicated by block 404. For example, as described above, the status unit 275 may provide the processing unit 110 an indication of the state of the monitoring device 150. If the processing unit 110 determines that the monitoring device 150 is not working property, then the processing unit 110 resets the monitoring device 150, as indicated by block 406. Each time the processing unit 110 accesses the status unit 275, the watchdog timer 260 begins to count down the predetermined period of time, as indicated by block 408.

In addition, the watchdog timer 260 may be configured to monitor communications from the processing unit 110 to the status unit 275 of the monitoring device 150, as indicated by block 410. If the processing unit 110 accesses the status unit 275 within the predetermined period of time, the watchdog timer 260 is reset to begin counting down the predetermined period of time, as indicated by block 412. More specifically, in one embodiment, the act of reading the status unit 275 triggers the countdown of the watchdog timer 260. It is noted however that in other embodiments, the watchdog timer 260 may be reset by other means; for example, the monitoring device 150 may be configured to send a status request signal to the processing unit 110, and the watchdog time 260 may be reset each time the processing unit 110 responds with a status signal.

The processing unit 110 may continue to access the status unit 275 and therefore continue resetting the watchdog timer 260 when the processing unit 110 is working properly. However, if the processing unit 110 fails to access the status unit 275 within the predetermined period of time, the watchdog timer 260 will count down to zero (block 414) and may force the monitoring device 150 to enter the failsafe mode of operation, as indicated by block 416. When the processing unit fails to access the status unit 275 within the predetermined period of time, the processing unit 110 may be malfunctioning or may have overextended its resources.

In one embodiment, the processing unit 110 may program a watchdog timer register with the predetermined period of time. The processing unit 110 may determine the value corresponding to the predetermined period of time based on the current application or function being performed. It is noted however that the predetermined period of time may be determined by other methods, for example, the system 100 may be configured to compile historical data with respect to the times the processing unit 110 accesses the status unit 275. In one embodiment, the watchdog timer register may be pre-programmed with a plurality of default time periods. In this embodiment, the processing unit 110 may be configured to selection one of the pre-programmed time periods depending on the current application or function being performed.

It is noted that the watchdog timer 260 may also be configured as a counter, which counts up to the predetermined amount of time. In one embodiment, the watchdog timer 260 and/or the status unit 275 may be implemented in hardware. In a further embodiment, the watchdog timer 260 and/or the status unit 275 may be implemented in software. In yet another embodiment, the watchdog timer 260 and/or the status unit 275 may be implemented in both hardware and software. In one embodiment, the functionality described above with regard to the watchdog timer 260 and/or the status unit 275 may be distributed across multiple components. In various embodiments, this type of functional distribution may also apply to other components described herein.

Furthermore, with reference to FIG. 2, the monitoring device 150 may perform one or more failsafe functions independent of the processing unit 110 when the monitoring device 150 enters the failsafe mode of operation. For example, one or more of the failsafe registers 277 may be pre-programmed to enable the monitoring device 150 to perform the one or more failsafe functions independent of the processing unit. In one embodiment, the one or more of the failsafe registers 277 are pre-programmed by the processing unit 110 based on the current application or function being performed. For example, as described above, the processing unit 110 may be controlling a fan subsystem via monitoring device 150 to perform a thermal management function with respect to subsystem 180. In this example, the processing unit 110 may pre-program a failsafe GPIO register so when the monitoring device 150 enters a failsafe mode of operation the GPIO 268 outputs (e.g., GPIO0-GPIO5) of the monitoring device 150 are forced into programmable failsafe states. For instance, one or more of channels GPIO0-GPIO5 may be forced high to turn on one or more of the fans of the fan subsystem to a predetermined speed (e.g., maximum speed). In this example, the monitoring device 150 is autonomously performing the failsafe function of controlling the operation of the one or more fans, during the failsafe mode of operation, to prevent the subsystem 180 from overheating.

In another example, as described above, the processing unit 110 may be performing a battery management function via monitoring device 150. In this example, the processing unit 110 may pre-program a failsafe DAC register to force one or more of the DAC 264 outputs (e.g., DAC0-DAC3) of the monitoring device 150 low when the monitoring device 150 enters a failsafe mode of operation. Since one or more of the DAC 264 outputs are forced to low state, the monitoring device 150 may autonomously stop the charging of the battery subsystem to prevent overcharging the one or more batteries.

It is noted however that in other embodiments the monitoring device 150 may comprise the functionality of independently detecting the current application or function being performed and determining the appropriate failsafe mode of operation when communications between the processing unit 110 and the monitoring device 150 fail. It is also noted that in other embodiments the processing unit 110 may pre-program other types of storage mechanisms associated with the monitoring device 150. In one embodiment, the GPIO 268 and the DAC 264 are forced to programmable failsafe states when the monitoring device 150 enters a failsafe mode of operation. For example, the entering the programmable failsafe states may include forcing the outputs associated with the GPIO 268 and/or the DAC 264 high or low, or maintaining the current state. Also, one or more of the outputs of the GPIO 268 may be tri-stated, for example, to be forced to operate as inputs. In another embodiment, other components of monitoring device 150 may be forced to programmable failsafe states.

When the monitoring device 150 enters the failsafe mode of operation, a bit of the status unit 275 is asserted to indicate that the monitoring device 150 is in the failsafe mode. For example, a ComFail bit of the status unit 275 is asserted to indicate that communications between the processing unit 110 and the monitoring device 150 failed and the monitoring device is operating in a failsafe mode. When the processing unit 110 accesses the status unit 275 of the monitoring device 150, for example, after the processing unit 110 begins working properly or resumes normal operation, it will detect that the failsafe mode bit (e.g., ComFail bit) is asserted and determine that the monitoring device is in the failsafe mode of operation. In one embodiment, after determining that the monitoring device is operating in a failsafe mode, the processing unit 110 may reset the monitoring device 150 to resume normal operations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A monitoring device configured to perform a plurality of monitoring functions, the monitoring device comprising:
   a watchdog timer configured to monitor communications between a processing unit and the monitoring device;
   wherein the watchdog timer is operable to cause the monitoring device to enter a failsafe mode of operation if the processing unit fails to communicate with the monitoring device within a predetermined period of time;
   one or more failsafe registers that are pre-programmed to enable the monitoring device to perform one or more failsafe functions independent of the processing unit when the monitoring device enters the failsafe mode of operation; and
   a status unit operable to provide the processing unit:
   an indication of whether the monitoring device is working properly, and
   an indication of whether the monitoring device is in the failsafe mode of operation.

2. The monitoring device of claim 1, further comprising a plurality of failsafe registers.

3. The monitoring device of claim 2, wherein one or more of the plurality of failsafe registers are pre-programmed to force one or more outputs of one or more components of the monitoring device into programmable failsafe states if the processing unit fails to communicate with the monitoring device within the predetermined period of time.

4. The monitoring device of claim 1, wherein the status unit comprises a bit operable to provide the processing unit an indication of whether the monitoring device is in the failsafe mode of operation.

5. The monitoring device of claim 1, wherein the status unit comprises a status register.

6. The monitoring device of claim 1, wherein the watchdog timer is operable to monitor communications from the processing unit to the status unit of the monitoring device.

7. The monitoring device of claim 6, wherein the watchdog timer is operable to be reset to begin counting down the predetermined period of time each time the processing unit accesses the status unit.

8. The monitoring device of claim 1, wherein the status unit comprises a bit operable to toggle each time the processing unit accesses the status unit, to provide the processing unit an indication that the monitoring device is working properly.

9. The monitoring device of claim 8, wherein the processing unit is operable to reset the monitoring device if the bit fails to toggle when the processing unit accesses the status unit and instead remains its current state.

10. The monitoring device of claim 1, wherein one of the plurality of monitoring functions of the monitoring device comprises temperature monitoring via one or more temperature sensors.

11. The monitoring device of claim 10, wherein the monitoring device is operable to enter the failsafe mode of operation if a sensed temperature exceeds a predetermined temperature limit.

12. The monitoring device of claim 1, wherein the watchdog timer is operable to monitor communications between the processing unit and the monitoring device if a watchdog functionality of the monitoring device is enabled.

13. The monitoring device of claim 1, wherein the predetermined period of time is programmable.

14. A method for triggering failsafe procedures with respect to a device when a processing unit fails to communicate with the device, wherein the device is configured to perform a plurality of monitoring functions, the method comprising:
   monitoring communications between the processing unit and the device;
   if the processing unit fails to communicate with the device within a predetermined period of time, causing the device to enter a failsafe mode of operation;
   pre-programming one or more of a plurality of failsafe registers to enable the device to perform one or more failsafe functions independent of the processing unit when the device enters the failsafe mode of operation; and
   providing the processing unit:
   an indication of whether the device is working properly, and
   an indication of whether the devices is in the failsafe mode of operation.

15. The method of claim 14, further comprising pre-programming one or more of a plurality of failsafe registers to force one or more outputs of one or more components of the device into programmable failsafe states if the processing unit fails to communicate with the device within the predetermined period of time.

16. The method of claim 14, wherein said monitoring communications between the processing unit and the device comprises monitoring communications from the processing unit to a status unit of the device.

17. The method of claim 16, further comprising resetting a watchdog timer to begin counting down the predetermined period of time each time the processing unit accesses the status unit of the device.

18. The method of claim 14, wherein said providing the processing unit an indication of whether the device is working properly comprises toggling a bit of a status unit each time the processing unit accesses the status unit, wherein said toggling is indicative that the device is working properly.

19. The method of claim 18, wherein the processing unit is operable to reset the device if the bit fails to toggle when the processing unit accesses the status unit and instead remains its current state.

20. A system, comprising:
a processing unit; and
a monitoring device coupled to the processing unit and configured to perform a plurality of monitoring functions, the monitoring device comprising:
   a watchdog timer configured to monitor communications between a processing unit and the monitoring device;
   wherein the watchdog timer is operable to cause the monitoring device to enter a failsafe mode of operation if the processing unit fails to communicate with the monitoring device within a predetermined period of time;
   one or more failsafe registers that are pre-programmed to enable the monitoring device to perform one more failsafe functions independent of the processing unit when the monitoring device enters the failsafe mode of operation; and
   a status unit operable to provide the processing unit:
      an indication of whether the monitoring device is working properly, and
      an indication of whether the monitoring device is in the failsafe mode of operation.

21. The system of claim 20, wherein the monitoring device further comprises a plurality of failsafe registers.

22. The system of claim 21, wherein one or more of the plurality of failsafe registers are pre-programmed to force one or more outputs of one or more components of the monitoring device into programmable failsafe states if the processing unit fails to communicate with the monitoring device within the predetermined period of time.

23. The system of claim 20, wherein the status unit comprises a bit operable to provide the processing unit an indication of whether the monitoring device is in the failsafe mode of operation.

24. The system of claim 20, wherein the status unit comprises a status register.

25. The system of claim 20, wherein the watchdog timer is operable to monitor communications from the processing unit to the status unit of the monitoring device.

26. The system of claim 25, wherein the watchdog timer is operable to be reset to begin counting down the predetermined period of time each time the processing unit accesses the status unit.

27. The system of claim 20, wherein the status unit comprises a bit operable to toggle each time the processing unit accesses the status unit, to provide the processing unit an indication that the monitoring device is working properly.

28. The system of claim 27, wherein the processing unit is operable to reset the monitoring device if the bit fails to toggle when the processing unit accesses the status unit and instead remains its current state.

29. The system of claim 20, wherein the system further comprises one or more subsystems, wherein the monitoring device is configured to perform the plurality of monitoring functions with respect at least one of the subsystems.

30. The system of claim 29, wherein one of the subsystems is a battery subsystem, wherein one of the plurality of monitoring functions includes battery management with respect to the battery subsystem.

31. The system of claim 29, wherein one of the plurality of monitoring functions includes temperature monitoring of one of the subsystems via one or more temperature sensors.

32. The system of claim 31, wherein the monitoring device enters the failsafe mode of operation if a sensed temperature corresponding to the one of the subsystems exceeds a predetermined temperature limit.

33. The system of claim 20, wherein the processing unit is operable to read the status unit of the monitoring device to determine a state of one or more subsystems.

34. The system of claim 20, wherein the processing unit is operable to read the status unit of the monitoring device to determine the state of the monitoring device, wherein if the processing unit determines that the monitoring device is in the failsafe mode of operation, the processing unit is further operable to reset the monitoring device to enter a normal mode of operation.

35. A device configured to perform thermal management functions in a system comprising a processing unit and one or more subsystems, the device comprising:
   a watchdog timer configured to monitor communications between the processing unit and the device, wherein the watchdog timer is operable to cause the device to enter a failsafe mode of operation if the processing unit fails to communicate with the device within a predetermined period of time;
   a temperature monitoring unit operable to sense a temperature of at least one of the subsystems via one or more temperature sensors, wherein the device is operable to enter the failsafe mode of operation if the sensed temperature corresponding to a subsystem exceeds a pre-programmed temperature limit;
   wherein the device is operable to perform one or more failsafe functions independent of the processing unit during the failsafe mode of operation, wherein one of the failsafe functions comprises controlling the operation of one or more system fans to cool the subsystem; and
   a status unit operable to provide the processing unit:
      an indication of whether the device is working properly, and
      an indication of whether the device is in the failsafe mode of operation.

36. The device of claim 35, further comprising a plurality of failsafe registers.

37. The device of claim 36, wherein one or more of the plurality of failsafe registers are pre-programmed to enable the device to perform the one or more failsafe functions independent of the processing unit during the failsafe mode of operation.

38. The device of claim 36, wherein one or more of the plurality of failsafe registers are pre-programmed to force one or more outputs of one or more components of the device into programmable failsafe states during the failsafe mode of operation.

39. The device of claim 35, wherein the status unit comprises a bit operable to toggle each time the processing unit accesses the status unit of the device, to provide the processing unit an indication that the device is working properly.

* * * * *